Oct. 19, 1971 R. T. TOWNSEND 3,613,154
FISH SKINNING DEVICE
Filed Oct. 15, 1969 3 Sheets-Sheet 2

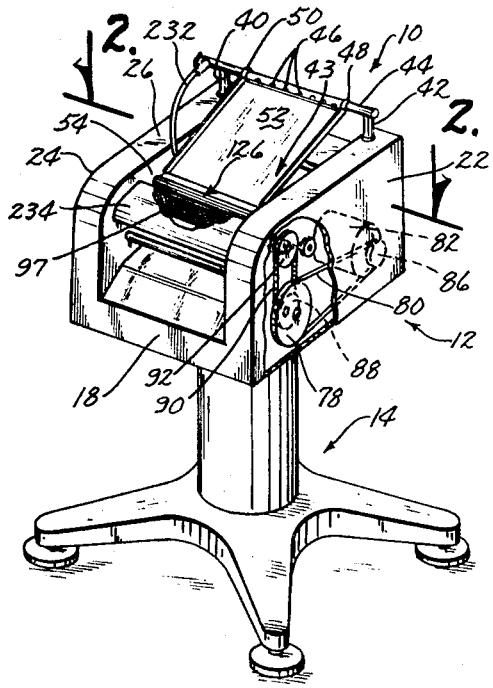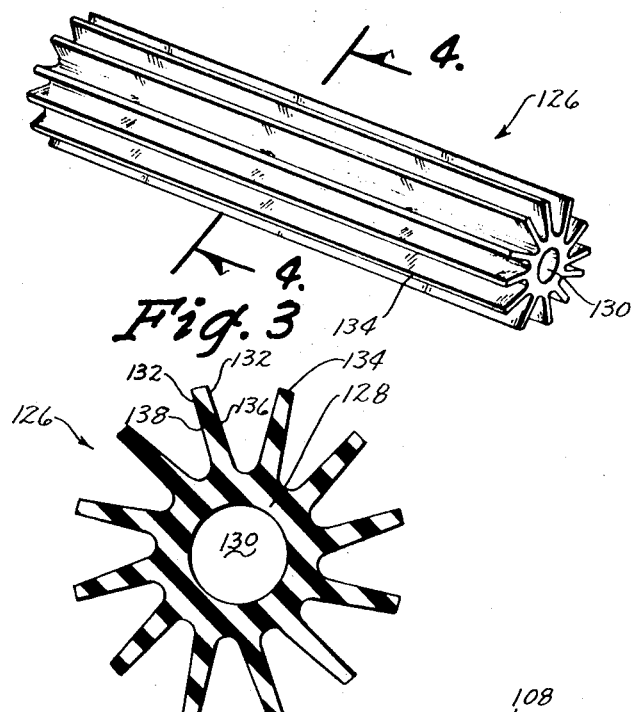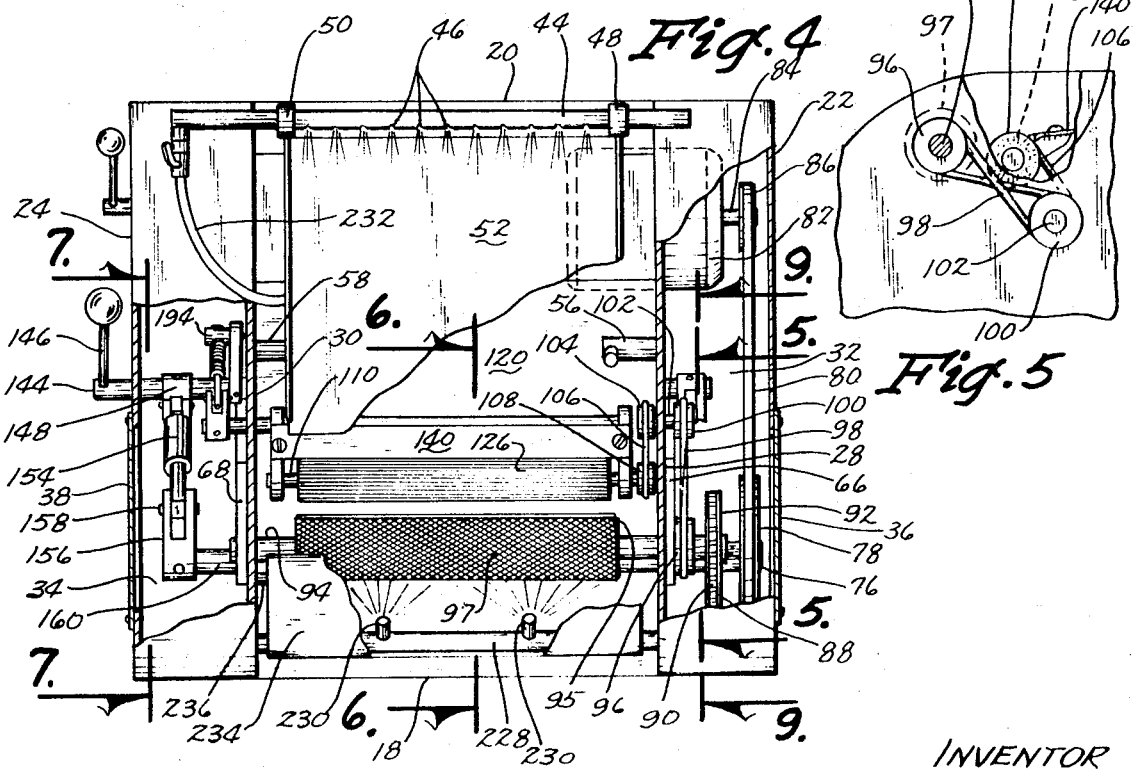

INVENTOR
RAY T. TOWNSEND
BY
Zarley, McKee & Thomte
ATTORNEYS

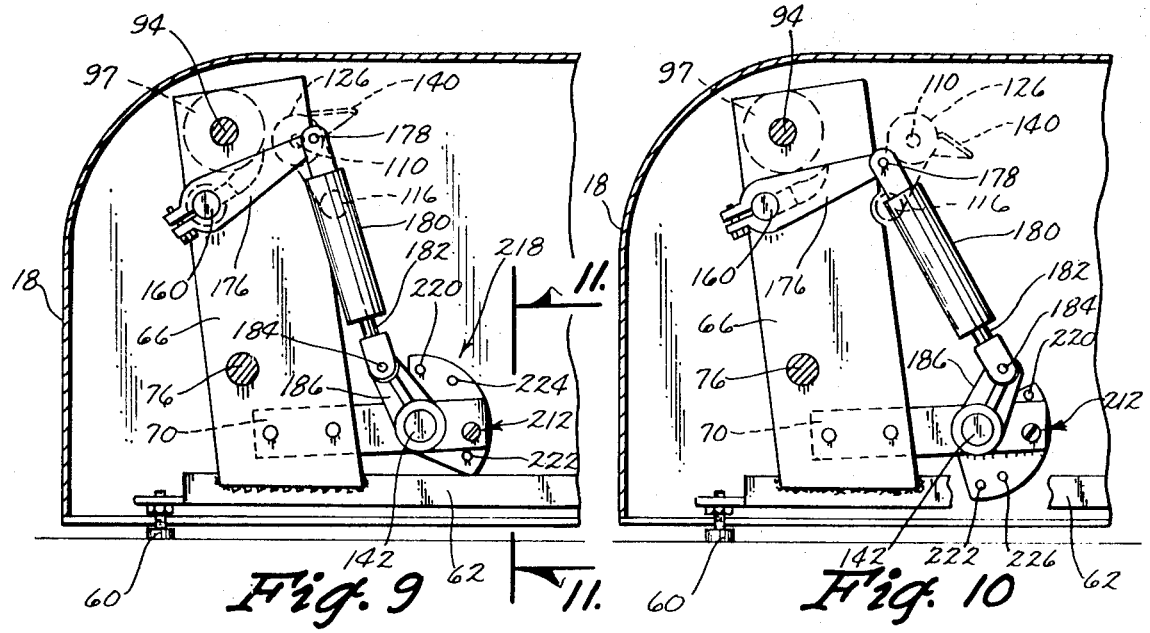
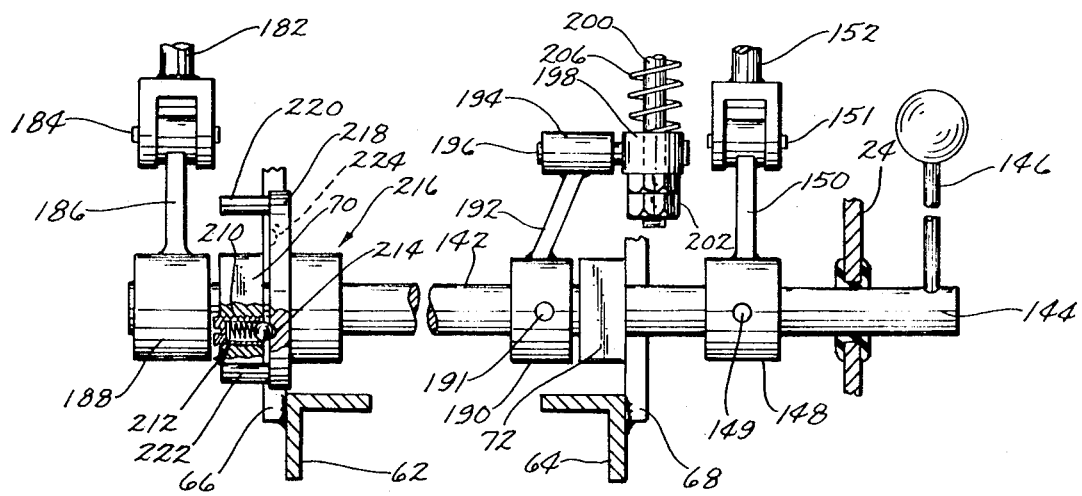
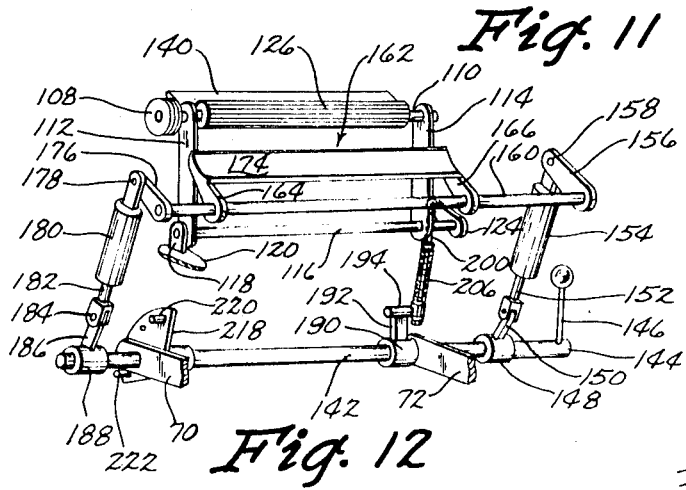

United States Patent Office 3,613,154
Patented Oct. 19, 1971

3,613,154
FISH SKINNING DEVICE
Ray T. Townsend, Des Moines, Iowa, assignor to Townsend Engineering Company, Des Moines, Iowa
Filed Oct. 15, 1969, Ser. No. 866,530
Int. Cl. A22c 25/17
U.S. Cl. 17—62
16 Claims

ABSTRACT OF THE DISCLOSURE

A fish skinning device comprising, a feed tray means mounted on a support means and adapted to support the fish to be skinned thereon. A cutting blade means is pivotally supported on the support means and is pivotal away from and towards a rotatable feed roller positioned thereabove. A pressure roller means is rotatably and pivotally mounted on the support means between the feed roller and the feed tray and is adapted to engage the under side of the fish being skinned to yieldably urge the same into engagement with the cutting blade and feed roller. Linkage means interconnects the cutting blade and the pressure roller to permit the cutting blade to be pivoted away from the feed roller and to permit the pressure roller to be pivoted away from the cutting blade and the feed roller. Means is also provided to permit the pressure roller to pivot away from the feed roller without causing the pivotal movement of the cutting blade.

---

Certain fish have extremely delicate flesh or meat and such delicacy makes it difficult, if not impossible, to skin the same without damaging the meat. Existing fish skinning devices do not satisfactorily remove the skin from the fish so as to completely remove the skin therefrom without damaging the meat thereof.

Therefore, it is a principal object of this invention to provide a fish skinning device.

A further object of this invention is to provide a fish skinning device which completely removes the skin from a fish filet without damaging the meat thereof.

A further object of this invention is to provide a fish skinning device having means thereon for efficiently feeding the filet through the device.

A further object of this invention is to provide a fish skinning device having a linkage means thereon for pivoting a pressure roller and cutting blade assembly away from the feed roller.

A further object of this invention is to provide a fish skinning device having means thereon for stripping the skin from the feed roller after it has been removed from the fish.

A further object of this invention is to provide a fish skinning device including means for pivoting the pressure roller thereof away from the cutting blade assembly to prevent damage to the pressure roller.

A further object of this invention is to provide a fish skinning device including means to yieldably lock the pressure roller and cutting blade assembly in "open" and "closed" positions.

A further object of this invention is to provide a fish skinning device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of the device with portions thereof cut away to more fully illustrate the invention;

FIG. 2 is an enlarged view as seen along lines 2—2 of FIG. 1 with portions thereof cut away;

FIG. 3 is a perspective view of the pressure roller used in this device;

FIG. 4 is an enlarged sectional view as seen along lines 4—4 of FIG. 3;

FIG. 5 is a sectional view as seen along lines 5—5 of FIG. 2 with portions thereof cut away;

FIG. 9 is a sectional view similar to FIG. 7 but taken from the opposite side of the machine;

FIG. 10 is a sectional view similar to FIG. 8 except that it is taken from the opposite side of the machine;

FIG. 11 is a partial enlarged sectional view as seen along lines 11—11 of FIG. 9; and FIG. 12 is a rear perspective view of the linkage means interconnecting the pressure roller and cutting blade assembly.

Figure 6:
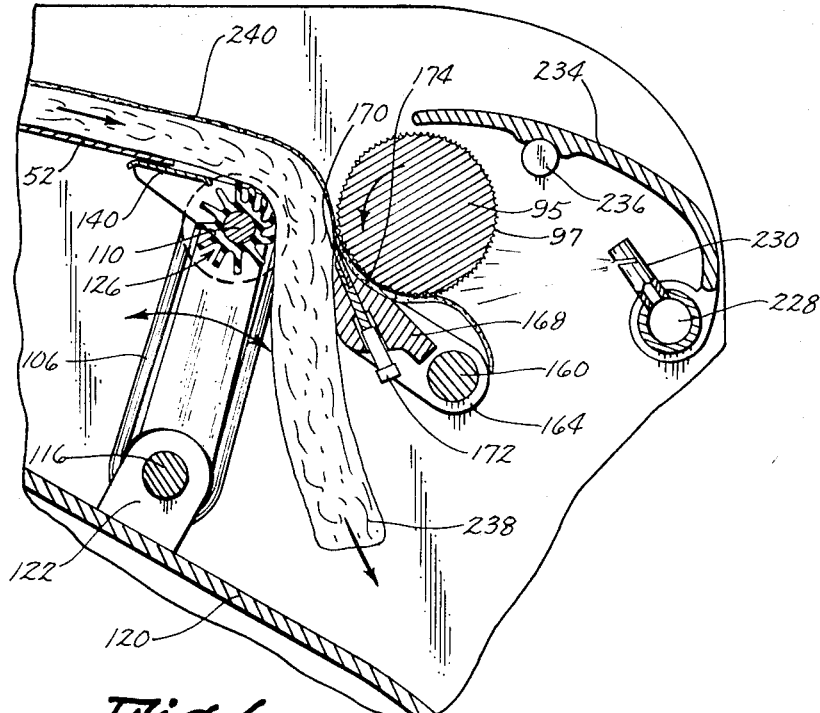
FIG. 6 is an enlarged sectional view as seen along lines 6—6 of FIG. 2 illustrating the skin being removed from a fish filet.

The machine of this invention is referred to by the reference numeral 10 and generally includes a cabinet 12 supported by a pedestal 14. Cabinet 12 includes a bottom 16, front portion 18, back portion 20, sides 22 and 24, and top 26. Cabinet 12 also includes a pair of walls 28 and 30 spaced inwardly of sides 22 and 24, respectively, the lower ends of which terminate above bottom 16. Side 22 and wall 28 define a compartment 32 therebetween while side 24 and wall 30 define a compartment 34 therebetween. Access panels 36 and 38 are provided on sides 22 and 24 respectively to permit the servicing of the components in compartments 32 and 34 respectively.

Cabinet 12 has a pair of pipes 40 and 42 extending upwardly therefrom adjacent back portion 20. A horizontally disposed pipe 44 is secured to the upper ends of pipes 40 and 42 and is in communication therewith. Post 40 is in communication with a source of water under pressure to permit water to be sprayed outwardly from the spray orifices 46 in pipe 44. Collars 48 and 50 are rotatably mounted on pipe 44 and support the upper end of a feed tray 52 thereon which extends downwardly therefrom into the open area 43 (FIG. 1) defined by walls 28 and 30. As seen in FIG. 2, a pair of stops 56 and 58 extend inwardly from walls 28 and 30 and are adapted to limit the downward pivotal movement of the feed tray 52.

Figure 7:
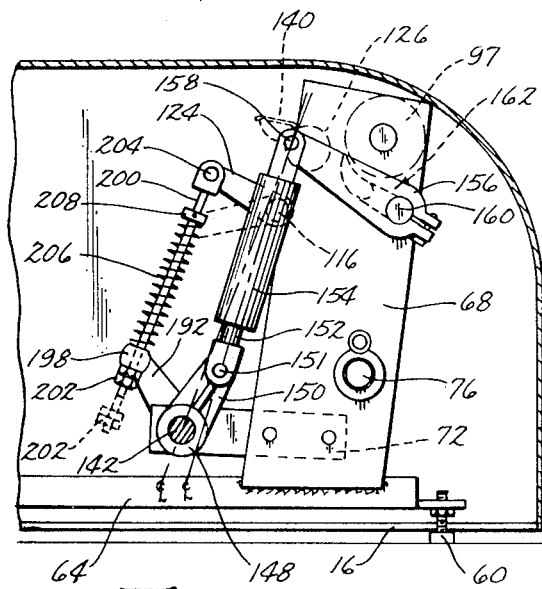
FIG. 7 is an enlarged sectional view as seen along lines 7—7 of FIG. 2 illustrating the pressure roller and cutting blade in "closed" positions.

Four leveling screws 60 extend through bottom 16 and engage the upper surface of pedestal 14. An elongated support angle 62 extends between one pair of the screws 60 while an elongated support angle 64 extends between the other pair of screws 60. Plates 66 and 68 are secured to angles 62 and 64 respectively and extend upwardly therefrom adjacent walls 28 and 30. As seen in FIGS. 7 and 9, arms 70 and 72 are secured to plates 66 and 68 respectively and extend rearwardly therefrom.

Shaft 76 is suitably rotatably mounted in plates 66 and 68 and extends therethrough and outwardly of wall 28. The right end of shaft 76, as viewed in FIG. 2, has a pulley 78 mounted thereon having a belt 80 extending therearound. An electric motor 82 is mounted in the back portion of cabinet 12 and includes a power shaft 84 having a pulley 86 mounted thereon. Pulley 86 receives the belt 80 thereon to enable the motor 82 to rotate shaft 76.

Shaft 76 also has a sprocket 88 mounted thereon inwardly of pulley 78 which has a chain 90 mounted thereon. Chain 90 extends around sprocket 92 which is mounted on one end of shaft 94. Shaft 94 includes a feed roller 95 having a knurled and serrated gripping surface 97. The opposite ends of shaft 94 are rotatably mounted on plates 66 and 68 adjacent the upper ends thereof. Shaft 94 has a pulley 96 secured thereto inwardly of sprocket 92. A belt 98 extends around pulley 96 and around pulley 100 provided on shaft 102. As seen in FIG. 5, belt 98 is arranged or twisted on the pulleys 96 and 100 to form a figure "8" so that shafts 94 and 102 will rotate in opposite directions. Shaft 102 rotatably extends through wall 28 and is rotatably supported thereby. Pulley 104 is secured to the inner end of shaft 102 and has a belt 106 mounted thereon which extends upwardly therefrom and extends around pulley 108 mounted on one end of shaft 110. The opposite ends of shaft 110 are rotatably supported by arms 112 and 114 respectively which extend downwardly therefrom as illustrated in FIG. 12. Shaft 116 is rigidly secured to the lower ends of arms 112 and 114 and extends therebetween outwardly thereof. One end of shaft 116 is rotatably mounted in a bracket 118 secured to cabinet wall 120 which extends upwardly and rearwardly between walls 28 and 30. The other end of shaft 116 is also rotatably mounted in a bracket 122 secured to cabinet wall 120 (FIG. 6). Arm 124 is clamped onto the end of shaft 116 and extends upwardly and rearwardly therefrom.

As seen in FIGS. 2 and 12, a resilient pressure roll sleeve 126 is mounted on shaft 110 for rotation therewith and includes a central hub 128 having a bore 130 extending therethrough. Sleeve 126 is provided with a plurality of equally spaced apart fins 132 which extend forwardly from hub 126 as illustrated in FIG. 4.

For purposes of description, each of the fins 132 will be described as having an outer end 134 and face portions 136 and 138. As seen in FIG. 4, portions 136 and 138 are not parallel to each other but tend to converge so that the inner ends of the fins are thicker than the outer ends. Preferably, face portion 136 is disposed at approximately 20 degrees to the transverse center line, that is, a center line which is transverse to the longitudinal center line of the roll. Preferably, face portion 138 is disposed at approximately 16 degrees to the said transverse center line. The relationship of the fins 132 with respect to the shaft 110 is best seen in FIG. 6. An elongated shoe 140 is rigidly secured at its opposite ends to arms 112 and 114 by any convenient means for movement therewith.

As seen in FIG. 12, a shaft 142 rotatably extends between and through arms 70 and 72 so as to have its opposite ends positioned outwardly thereof respectively. End 144 of shaft 142 extends outwardly through side 24 of cabinet 12 and has a handle 146 extending upwardly therefrom. Collar 148 is rigidly secured to shaft 142 by set screw 149 for rotation therewith outwardly of arm 72 and has an ear 150 extending upwardly therefrom. The upper end of ear 150 is pivotally connected to the lower end of a spring loaded rod 152 extending from a pressure cylinder 154. Pressure cylinder 154 is pivotally conected at its upper end to one end of arm 156 by pin 158. As seen in FIG. 12, arm 156 extends downwardly and rearwardly from pin 158 and is rigidly connected at its lower rearward end to one end of shaft 160. Shaft 160 is rotatably mounted in and extends through plates 66 and 68 so that its opposite ends are positioned outwardly thereof respectively.

A skinning blade assembly 162 is mounted on shaft 160 and comprises a pair of end supports 164 and 166 which are rigidly secured at one end thereof to the shaft 160 and extend upwardly and forwardly therefrom. Blade support 168 extends between the end supports 164 and 166 and includes a skinning blade 170 which is removably mounted in a channel formed therein. A plurality of free-floating plungers 172 are provided to push the blade 170 from the channel to permit cleaning and/or replacement of the blade. As seen in FIG. 6, blade support 164 includes a curved portion 174 having a radius of curvature sufficient to permit the blade support 168 to be positioned with respect to the surface 97 of roller 95.

The other end of shaft 160 has an arm 176 rigidly secured thereto which extends upwardly and forwardly therefrom as seen in FIG. 12. The upper end of arm 176 is pivotally connected by a pin 178 to the upper end of a pressure cylinder 180 which extends downwardly and rearwardly therefrom. The lower end of the spring loaded pressure cylinder rod 182 is pivotally connected by a pin 184 to the upper end of ear 186. Ear 186 is secured at its lower end to collar 188 which embraces and which is rigidly secured to shaft 142 for rotation therewith. The pressure cylinders 154 and 180 each have a spring means provided therein (not shown) which yieldably urges the rods 152 and 182 outwardly therefrom.

Collar 190 is rigidly secured to shaft 142 by set screw 191 inwardly of arm 72 and has an arm 192 extending therefrom. Tube 194 is provided on the end of arm 192 which rotatably supports a rod 196 extending outwardly therefrom as best seen in FIG. 11. Sleeve 198 is secured to the rod 196 (FIG. 11) and slidably receives a plunger rod 200 extending therethrough. The lower end of rod 200 is provided with a nut assembly 202 threadably mounted thereon. The upper end of rod 200 is pivotally connected by pin 204 to arm 124. Spring 206 embraces rod 200 above sleeve 198 to yieldably resist the downward slidable movement of plunger rod 200 with respect to sleeve 198. Set screw collar 208 embraces and is secured to rod 200 at the upper end of spring 206 and is adjustably positioned on rod 200 so that the tension of spring 208 may be varied as required.

The rearward end of arm 70 is provided with a threaded bore 210 formed therein in which is mounted a ball detent assembly 212. As seen in FIG. 11, the spring loaded ball 214 of the assembly protrudes laterally from arm 70. Collar 216 is rigidly mounted on shaft 142 for rotation inwardly of arm 70 and includes a quadrant plate 218 which is pivotable or rotatable by the ball 214 as shaft 142 is rotated. Quadrant plate 218 is provided with stop pins 220 and 222 secured thereto adjacent the ends thereof which extend laterally therefrom. Pins 220 and 222 are adapted to engage arm 70 to limit the pivotal movement of quadrant plate 218 with respect to arm 70. Preferably, stop pins 220 and 222 are positioned approximately 130 degrees apart. Quadrant plate 218 is also provided with a pair of spaced apart dimples or detent surfaces 224 and 226 formed therein which are adapted to receive the ball 214 therein at times. Preferably, dimple 226 is positioned approximately 20 degrees from stop pin 222 while dimples 224 and 226 are preferably spaced apart 66 degrees.

Cabinet 12 is also provided with a water conduit 228 extending across the upper forward end thereof and having a plurality of water jets 230 thereon adapted to spray a flat jet of water onto the shaft 94 at a point just above the tangent thereof as illustrated in FIG. 6. Water conduit 228 is in fluid communication with a conduit 232 which is connected to pipe 44. Shield 234 is pivotally mounted on conduit 228 and is adapted to partially extend over roller 95. Cabinet 12 is provided with a stop 236 which is in the pivotal path of shield 234 to limit the pivotal movement thereof as illustrated in FIG. 6.

For purposes of description, the numeral 238 refers to a fish filet having a skin 240 thereon.

The normal method of operating the device of this invention is as follows: The water valve controlling the flow of water to pipe 44 and conduit 228 would be opened so that water will flow downwardly on feed tray 52 and so that water will be sprayed on the shaft 94 as previously described. The water flowing downwardly on tray 52 acts as a water slide to aid the filet 238 in sliding downwardly therealong. The electric motor 82 is energized so that shaft 94 will be rotated in a counter-clock-wise direction as viewed in FIG. 6 and so that pressure roll sleeve 126 is rotated in a clockwise direction as viewed in FIG. 4.

Handle 146 would initially be moved so that ball 214 is positioned in dimple 226 (FIG. 9). The movement of handle 146 causes shaft 142 to be rotated which causes quadrant plate 218 to be pivoted with respect to arm 70 and detent ball assembly 212. Stop pin 222 limits the pivotal movement of quadrant plate 218 and aids the operator in positioning detent ball 214 in dimple 226. The engagement of the spring loaded detent ball 214 with the dimple 226 yieldably maintains the quadrant plate 218 and the shaft 142 in the position illustrated in FIGS. 7 and 9. The spring rods 152 and 182 also urge stop pin 222 into engagement with arm 70 due to the downward force exerted thereby. The spring loaded rods 152 and 182 yieldably urge quadrant plate 218 to be rotated in a counter-clock-wise direction when stop pin 222 engages arm 70 (FIG. 9) and such pressure aids in maintaining the quadrant plate in the position of FIG. 9. In moving to the position of FIGS. 7 and 9 it can be seen that shaft 142 has caused collars 148 and 188 to be rotated and the rotation of collars 148 and 188 causes pressure cylinders 154 and 180 to pivot arms 156 and 176 upwardly. The upward pivotal movement of arms 156 and 176 causes shaft 160 to be rotated which causes skinning blade assembly 162 to be pivoted upwardly to a position closely adjacent the roller 95.

In the position of FIGS. 7 and 9, spring 206 yieldably urges plunger rod 200 upwardly against the pin 204 which causes arm 124 to rotate or pivot shaft 116 in a clockwise direction as viewed in FIG. 7. The clockwise rotation of shaft 116 causes the rotating pressure roll sleeve 126 to be pivotally moved towards the roller 95 and the skinning blade assembly 162.

The fish filet 238 to be skinned is then placed upon the feed tray 52 with the skin 240 being positioned on the upper side thereof. The filet 238 slides downwardly on the water flowing downwardly on tray 52. The oppositely rotating sleeve 126 and roller 95 grip the lowermost end of the filet and draws the same therebetween. The flexible fins 132 of the sleeve 126 grip the underside of the filet 238 in the manner illustrated in FIG. 6 and are deflected thereby. As previously stated, the spring 206 yieldably pivots sleeve 126 towards the blade assembly 162 and such yieldable pressure insures that the fins 132 will sufficiently engage the filet to pull the same downwardly into engagement with the skinning blade assembly 162. The serrated and knurled surface 97 of roller 95 together with the fins 132 pulls the filet downwardly therebetween so that the skinning blade 170 may remove the skin 240 from the filet. As the skin 240 is removed from the filet 238, the skin passes over the top curved surface 174 of blade support 168 and beneath the roller 95. The skin 240 exhibits a tendency to cling or stick to the surface 97 but the water jets 230, which are directed at the roller 95 just above the tangent thereof, jet or strip the skin therefrom.

When thicker or heavier portions of the filet passes between the sleeve 126 and roller 95, the sleeve 126 is pivotally moved rearwardly away from roller 95 which causes arms 112 and 114 to pivot shaft 116. The pivoting of shaft 116 causes arm 124 to pivot downwardly so that rod 200 slidably extends downwardly through sleeve 198 without causing undesirable movement of any of the other components of the device. The spring 206 on rod 200 yieldably resists the downward movement of the rod 200 and yieldably urges the sleeve 176 towards the filet. Spring 206 moves sleeve 176 back towards the skinning blade assembly as soon as the thicker portion of the filet has passed.

The normal or "closed" position of the various components is illustrated in FIGS. 7 and 9 as discussed previously. However, there may be situations where the operator wishes to immediately halt the skinning operation and the alternate or "open" position of the handle 146 permits the skinning operation to be quickly halted.

Figure 8:
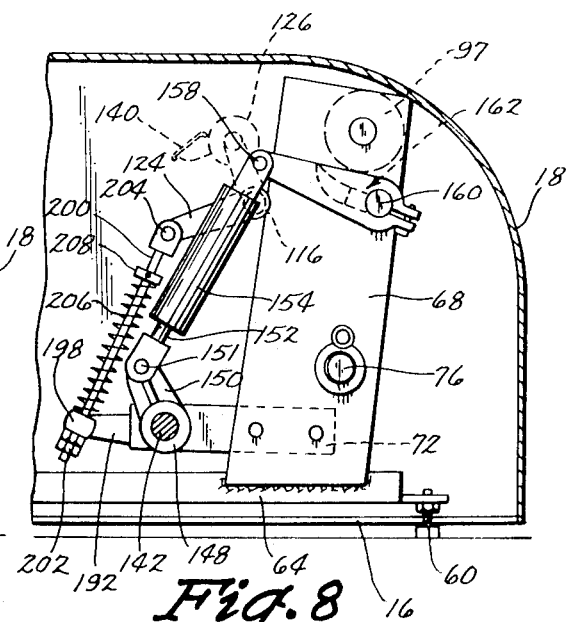
FIG. 8 is a view similar to FIG. 7 except that the pressure roller and cutting blade assembly have been moved to their "open" position.

For example, the filet may have such a configuration that it is being undesirably skinned or it may become clogged or stuck in the machine. In any event, if the operator desires to free the filet from its engagement with the sleeve and skinning blade, it is simply necessary to pivot handle 146 so that shaft 142 is rotated from the relative position of FIGS. 7 and 9 to the position of FIGS. 8 and 10.

The movement of handle 146 causes shaft 142 to be rotated so that quadrant plate 218 is pivotally moved with respect to the detent ball 214 and so that dimple 226 is moved out of engagement with the ball 214. In FIG. 7, it can be seen that the pivotal connection (pin 151) of ear 150 and rod 152 is slightly forward of the center line which extends between pin 158 and shaft 142. The pivotal connection of rod 182 (pin 184) is also slightly forward of a center line extending between pin 178 and shaft 142. Such a relationship of the pivot points results in the sleeve 126 being pivotally moved away from the skinning blade much more rapidly than the rate which the skinning blade is being pivoted away from the roller 95 since shaft 142 must be rotated until the pins 151 and 184 are moved rearwardly of the center lines just described before the skinning blade begins to pivot away from the shaft 94. The sleeve 126 is being pivoted away from the cutting blade assembly prior to the pins 151 and 184 passing the said center lines. The handle 146 would be moved until dimple 224 received the ball 214 to yieldably maintain the components in the position seen in FIG. 10. The pressure cylinders 150 and 180 also yieldably maintain the quadrant plate 218 in the position of FIGS. 8 and 10 since the spring loaded rods tend to rotate the quadrant plate in a clockwise direction as viewed in FIG. 10. The pressure exerted on the quadrant plate aids in yieldably maintaining the quadrant plate in the position of FIGS. 8 and 10. As seen in FIG. 10, stop pin 220 engages arm 70 when the skinning blade assembly and pressure roller have been pivoted to their "open" positions. The pivotal movement of sleeve 126 does not adversely affect the driving thereof since shaft 102 is in axial alignment with shaft 116.

The fact that the pressure sleeve 126 is pivoted away from the roller 95 at a faster rate than the skinning blade is pivoted prevents the sleeve 126 from engaging the skinning blade thereby insuring that the sleeve will not be damaged by the skinning blade. If the blade and sleeve were simultaneously pivoted at the same speed, the sleeve 126 could engage the skinning blade. Additionally, if the blade and sleeve were simultaneously pivoted away from the feed roller 95 at the same speed, the filet 238 could possibly become clogged in the machine. The arrangement of the parts insures that the pressure on the underside of the filet will be released slightly before the skinning blade is pivoted away from the roller 95.

Thus it can be seen from the foregoing description that a unique fish skinning device has been provided which efficiently removes the skin from the fish filet without damaging the filet. Thus the device accomplishes at least all of its stated objectives.

I claim:
1. A fish skinning device comprising:
   a frame means;
   a support means having first and second ends on said frame means and being adapted to support the fish being skinned;
   a skinning blade means having a horizontal cutting edge secured to said frame means adjacent one end of said support means;
   a feed roller means rotatably mounted about a horizontal axis on said frame means adjacent said skinning blade means;
   a pressure roller means rotatably mounted on said frame means adjacent said support means and in spaced relation to said skinning blade means whereby fish moving from said supporting means for removal of skin on its upper side by coaction of said skinning blade means and said feed roller means will pass in pressure contact over said pressure roller means; said skinning blade means and said pressure roller means being movably mounted on said support frame for movement toward and away from said feeder roller means; and control means connected to said skinning blade and pressure roller means for selectively moving said skinning blade means and said pressure roller means away from said feeder roller means.

2. The device of claim 1 wherein said pressure roller means comprises a central hub portion having a plurality of substantially rectangular resilient fins extending radially outwardly therefrom; said fins having their radial configurations normally deformed upon pressure contact with said fish.

3. The device of claim 2 wherein each of said fins have converging forward and rearward faces with respect to the direction of rotation thereof, said forward face being rearwardly offset in an inclined relationship with respect to the radius thereof.

4. The device of claim 1 wherein a linkage means interconnects said skinning blade means and said pressure roller means to pivot said skinning blade means away from said feed roller means and to pivot said pressure roller means away from said skinning blade means and said feed roller means.

5. The device of claim 4 wherein said linkage means comprises a first shaft rotatably mounted about a horizontal axis on first and second spaced apart arms secured to said frame means, a handle means on one end of said first shaft for rotating said first shaft between first and second positions, said skinning blade being secured to a second shaft rotatably mounted on said frame means, a third shaft rotatably mounted on said frame means below said pressure roller means, third and fourth spaced apart arms rigidly secured to said third shaft and extending upwardly therefrom, a fourth shaft rotatably mounted on the upper ends of said third and fourth arms, said pressure roller means being mounted on said fourth shaft, a fifth arm secured at one end to one end of said third shaft and extending upwardly therefrom, a push rod pivotally secured at its upper end to the other end of said fifth arm, and extending downwardly therefrom, a sleeve means pivotally secured to said first shaft and spaced therefrom, said push rod being slidably received by said sleeve means and adapted to cause said third shaft to be pivoted in a first direction when said first shaft is moved to its first position, a spring means on said rod yieldably resisting the downwardly sliding movement of said push rod in said sleeve means, said push rod sliding through said sleeve means when said third shaft is pivoted in a second direction, the pivotal movement of said third shaft is pivoted in said second direction, sixth and seventh arms secured at one end thereof to the opposite ends of said second shaft respectively, first and second pressure cylinders pivotally connected at their upper ends to the other ends of said sixth and seventh arms respectively, said pressure cylinders each having spring loaded rods extending downwardly therefrom which are pivotally connected to ears extending from said first shaft.

6. The device of claim 5 wherein said first shaft has a quadrant plate secured thereto, said quadrant plate having first and second spaced apart stop pins extending therefrom adapted to engage one of said first and second arms to limit the pivotal movement of said first shaft in first and second directions and to position said first shaft in said first and second positions.

7. The device of claim 6 wherein said quadrant plate has first and second spaced apart dimples formed therein, said one arm having a spring loaded detent ball adapted to engage one of said dimples to yieldably position said first shaft in said first and second positions.

8. The device of claim 7 wherein the pivotal connection of said ears and said pressure cylinders rods is offset forwardly of a line extending between the rotational axis of said first shaft and the pivotal connection between the upper ends of said pressure cylinders and said sixth and seventh arms so that movement of said first shaft from its said first position to its second position results in said pressure roller means being pivoted away from said feed roller means and said skinning blade means before said skinning blade means is pivoted away from said feed roller means.

9. The device of claim 1 wherein said support means has a water conduit at its upper end adapted to direct water downwardly on said support means.

10. The device of claim 1 wherein a fluid conduit is secured to said frame means and is connected to a source of fluid under pressure, nozzle means on said fluid conduit to direct a jet of fluid in a tangential direction towards said feed roller means to force any skin on said feed roller means to separate from said feed roller means.

11. The device of claim 1 wherein said feed roller means is positioned substantially in the path of said fish as it moves from said support means, and said cutting blade means is positioned below said feed roller means, whereby skin removed from said fish will pass downwardly between said feed roller means and said cutting blade means, and the skinned fish will move downwardly between said pressure roller means and said cutting blade means.

12. The device of claim 1 wherein said blade skinning means includes a flat cutting blade element disposed in an inclined position and extending upwardly from a lower horizontal edge toward said support means and terminating in said horizontal cutting edge adjacent said feed roller means.

13. The device of claim 1 wherein a control means is operatively secured to said pressure roller means and said skinning blade means for simultaneously pivoting said pressure roller means and said cutting blade means away from said feed roller means.

14. The device of claim 13 wherein a first means on said control means resiliently urges said pressure roller means towards said skinning blade means.

15. A fish skinning device comprising:
a frame means;
a support means having first and second ends on said frame means and being adapted to support a fish being skinned;
a skinning blade means having a horizontal cutting edge secured to said frame means adjacent one end of said support means;
a feed roller means rotatably mounted about a horizontal axis on said frame means adjacent said skinning blade means;
a pressure roller means rotatably mounted on said frame means adjacent to said support means and in spaced relation to said skinning blade means whereby fish moving from said supporting means for removal of skin on its upper side by coaction of said skinning blade means and said feed roller means will pass in pressure contact over said pressure roller means;
said pressure roller means comprising a central hub portion having a plurality of substantially rectangular resilient fins extending radially outwardly therefrom, said fins having their radial configurations normally deformed upon pressure contact with said fish;
said pressure roller means being movably mounted on said frame for movement towards and away from said feeder roller means;
bias means associated with said pressure roller means for yieldably hohlding said pressure roller means in pressure contact with said fish as said fish passes over said pressure roller means.

16. The device of claim 15 wherein each of said fins have converging forward and rearward faces with respect to the direction of rotation thereof, said forward face being rearwardly offset in an inclined relationship with respect to the radius thereof.

References Cited

UNITED STATES PATENTS

| | | | |
|---|---|---|---|
| 2,856,630 | 10/1958 | Lewis | 17—62 X |
| 3,031,714 | 5/1962 | Skrmetta et al. | 17—72 |
| 3,031,714 | 5/1962 | Skrmetta et al. | 17—72 |
| 3,215,179 | 11/1965 | Schill | 146—130 |
| 3,513,893 | 5/1970 | Townsend | 17—62 X |

LUCIE H. LAUDENSLAGER, Primary Examiner

U.S. Cl. X.R.

146—130